United States Patent
Haerle et al.

(10) Patent No.: US 6,564,717 B2
(45) Date of Patent: May 20, 2003

(54) CIRCUIT ARRANGEMENT FOR DRIVING AN OCCUPANT PROTECTION SYSTEM GAS GENERATOR WHOSE IGNITION PROCESS CAN BE INFLUENCED BY A MAGNETIC FIELD

(75) Inventors: Thomas Haerle, Marktoberdorf (DE); Johann Florian, Schrobenhausen (DE); Gerhard Roth, Allersberg (DE); Guido Wetzel, Neuburg/Donau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 10/017,496

(22) Filed: Dec. 14, 2001

(65) Prior Publication Data

US 2002/0073868 A1 Jun. 20, 2002

(30) Foreign Application Priority Data

Dec. 15, 2000 (DE) .......................... 100 62 756

(51) Int. Cl.[7] .......................... F23Q 7/02; F23Q 21/00; F42C 21/00; F42C 11/00; F42C 15/40; B60R 21/26; B60R 21/28
(52) U.S. Cl. .................. 102/262; 102/206; 102/215; 102/218; 280/736; 280/742
(58) Field of Search ................ 280/736, 737, 280/742; 102/206, 215, 218, 262

(56) References Cited

U.S. PATENT DOCUMENTS

| 4,275,901 A | * | 6/1981 | Okada .......................... 280/741 |
| 4,887,843 A | | 12/1989 | Husby |
| 5,284,330 A | | 2/1994 | Carlson et al. |
| 5,683,105 A | * | 11/1997 | Jackson ....................... 280/737 |
| 5,857,698 A | * | 1/1999 | Fuerst et al. ................ 280/737 |
| 5,927,753 A | * | 7/1999 | Faigle et al. ................ 280/735 |
| 6,022,045 A | * | 2/2000 | Faigle ......................... 280/736 |
| 6,036,226 A | * | 3/2000 | Brown et al. ............... 280/736 |
| 6,068,288 A | * | 5/2000 | Karolek et al. ............. 280/735 |
| 6,076,852 A | * | 6/2000 | Faigle ......................... 280/735 |
| 6,237,948 B1 | * | 5/2001 | Maschek et al. ............ 280/735 |

FOREIGN PATENT DOCUMENTS

| DE | 3733399 | 4/1988 |
| DE | 3919376 | 12/1990 |
| DE | 19507619 | 9/1996 |
| DE | 19826704 | 12/1999 |
| EP | 0360376 | 3/1990 |
| WO | WO98/33684 | 8/1998 |

OTHER PUBLICATIONS

U. Tietze et al.; Halbleiter–Schaltungstechnik, ("Semiconductor Circuit Technology"), 10th Edition, Springer–Verlag 1993, pp. 563–564.

* cited by examiner

Primary Examiner—Bernarr E. Gregory
Assistant Examiner—H. A. Blackner
(74) Attorney, Agent, or Firm—W. F. Fasse; W. G. Fasse

(57) ABSTRACT

The disclosure describes a circuit arrangement for driving an occupant protection system gas generator whose ignition process can be influenced by a magnetic field; this is based on a switching control principle, with the load coil generating the magnetic field being itself used as a component part of the switching control. For a fast reduction of the magnetic field and thus for accelerating the ignition process, a resistor may by connected into the free-wheeling branch, which is bridged in normal operation. Alternatively, it is possible to effect a return feed of the energy stored in the coil into the self-sufficiency capacitor.

6 Claims, 2 Drawing Sheets

CIRCUIT ARRANGEMENT FOR DRIVING AN OCCUPANT PROTECTION SYSTEM GAS GENERATOR WHOSE IGNITION PROCESS CAN BE INFLUENCED BY A MAGNETIC FIELD

BACKGROUND OF THE INVENTION

The invention relates to a circuit arrangement for driving an occupant protection system gas generator whose ignition process can be influenced by a magnetic field, the protection system being particularly an airbag.

Gas generators for airbags with an ignition process controllable by a magnetic field are known, for example, from WO 98/33684, where the magnetic field serves to influence the viscosity of a damper fluid; this in turn influences the movement of a piston moved by the pressure in the combustion chamber arising after an initial ignition, which piston also influences the supply of further liquid or gas-type fuel into the combustion chamber. The piston controls the size of the flow aperture or generates a pressure acting on the fuel, which controls the fuel quantity flowing into the combustion chamber and thus the fuel burn-off, that is, the ignition process and thus the inflation behavior of the airbag. Here the magnetic field is generated by a coil arranged around the damping cylinder and is to feature a strength in accordance with the required burn-off speed. Magneto-rheological damping fluids, whose viscosity can be changed accordingly by a magnetic field, are introduced, for example, by the U.S. Pat. No. 5,284,330. The damping increases with increasing current and thus increasing magnetic field. With regard to the setup and operating mode of such a gas generator, supplementary reference is expressly made to WO 98/33684.

Furthermore, in future it will also be necessary to take into consideration propellant gases whose burn-off behavior can be influenced directly by the strength of an electric field. All gas generators with a technical property that can be directly changed through the strength of a magnetic field will be understood as being gas generators whose ignition process can be influenced by a magnetic field. When coils are used as energy stores or for transformation purposes in the ignition current circuit, they feature a purely electric and exactly no such field action on the gas generator.

In principle, for the energy-efficient supply of smaller loads with a specifiable supply voltage or a supply current, for example from Tietze/Schenk: "Halbleiter-Schaltungstechnik" ("Semiconductor Circuit Technology", 10th edition, Springer-Verlag 1993, pp. 563–564 switching controls are known where a circuit element and a storage inductance are connected in between input and output—with current or voltage being determined on the load side, compared with a nominal value, and the circuit element controlled by pulse width modulation in relation to the comparison result. In the open switch position, a free-wheeling diode polarized opposite to the supply voltage acts as a free-wheeling branch for the storage inductance.

SUMMARY OF THE INVENTION

The invention introduces a suitable circuit arrangement for driving such a gas generator, with the said circuit arrangement providing for a magnetic field control which is as precise as possible. In addition, even in the event of a failure in the supply voltage infeed, triggering is still possible solely with a self-sufficient capacitor.

The operating mode of the circuit presented is based on the switch controller principle—but not its setup as instead of the storage inductance normally connected in between the input and output of switch controllers, the load coil generating the magnetic field is itself used as a component part of the switch controller. Besides saving the storage inductance which would otherwise be additionally required, the energy storage function of the load coil is additionally used to reduce the dissipation and thus the energy requirement; in particular, in cases of self-sufficiency this extends the self-sufficiency period or, for specified self-sufficiency period requirements, it also reduces significantly the required size of the self-sufficiency capacitor when compared with a simple application of switch controllers.

It needs to be taken into account here that the drive circuit and the gas generator are usually offered as separate components, even originating from different manufacturers, but that, nevertheless, the load coil in the gas generator becomes a functional part of the drive circuit.

Switch controllers are based on a pulse width modulated control of the circuit element, and an associated free-wheeling phase of the coil. It is conceivable that the pulse width ratio can be solely controlled in accordance with a specified nominal current without feedback. However, when embodied as a feedback control loop, the circuit will also detect the actual current through the coil, compare the same with a nominal value, and drive a circuit element—connected in series to the coil—by pulse width modulation in relation to the result of the aforesaid comparison.

In addition, between circuit element and coil, a free-wheeling diode is connected in parallel to the coil. Via the switching frequency and the switching threshold, the strength of the magnetic field and the fluctuation range of the current can be specified exactly.

Preferably, a resistor that might be bridged over can be connected in series to the free-wheeling diode; if a reduction in the magnetic field of the coil is required, the magnetic field can be reduced even more quickly by means of this resistor. This is the case in particular if a significant acceleration in airbag inflation is required after the start of an accident sequence, and therefore the viscosity of the magneto-rheological damping fluid is to be reduced quickly. On the other hand, for charging and keeping the current constant, the bridging-over will keep losses during the free-wheeling phase to a minimum, which is particularly advantageous in self-sufficient operation due to the limited energy reserves for triggering the vehicle occupant protection device.

Alternatively, it is possible to feed back the energy stored in the coil into the self-sufficiency capacitor.

DESCRIPTION OF THE PREFERRED EMBODIMENTS

Figure 1:
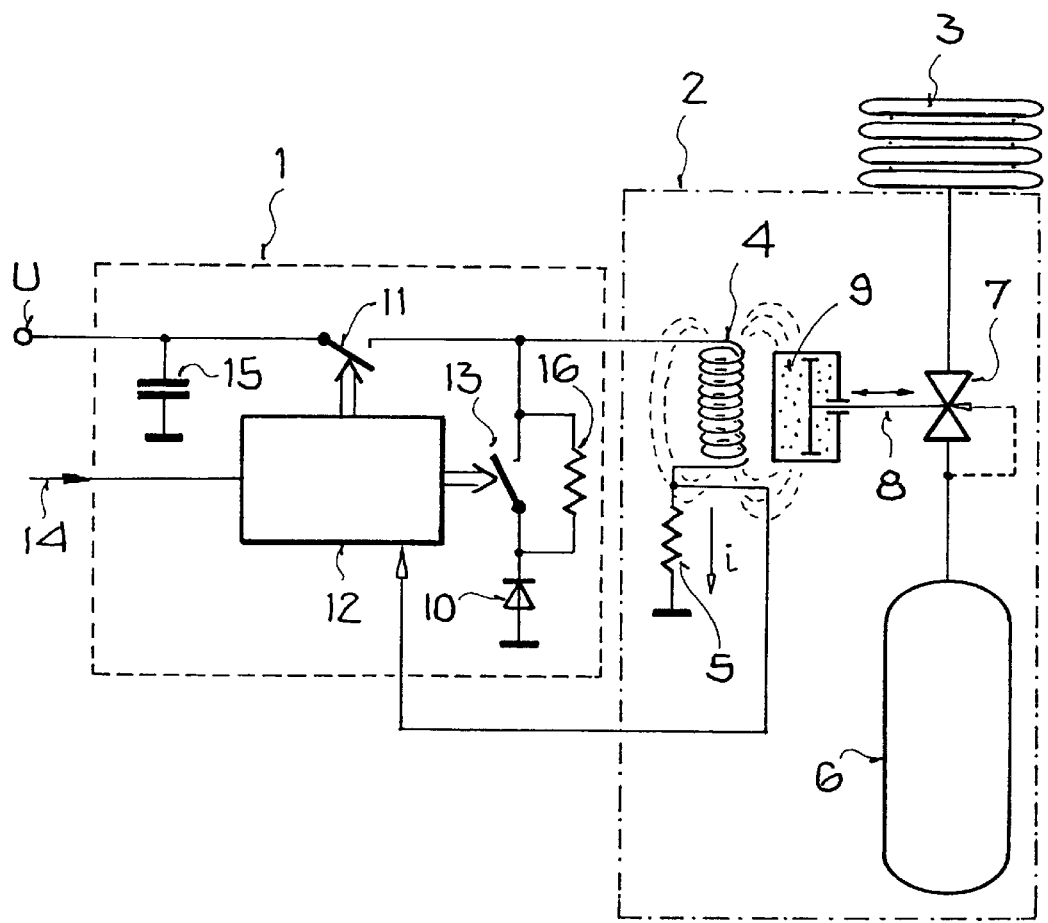
FIG. 1 Circuit arrangement for driving an occupant protection system gas generator whose ignition process can be influenced by a magnetic field FIG. 2 Circuit arrangement with return feed

FIG. 1 shows a circuit arrangement 1 for driving a gas generator 2 as used for an airbag 3. The operating mode of this gas generator is based on a liquid flammable propellant gas 6 and a controllable valve construction 7 which, in response to a trigger command and an initial ignition, allows the propellant gas to flow into a combustion chamber where it is ignited. The gas pressure which arises during this process acts on the valve construction 7 and leads to a further opening of the valve construction 7. The valve construction 7 is only shown in a functional outline diagram and can be embodied in the form of a movable piston according to WO-98/33684 described above, with alternative designs being also conceivable.

However, the opening movement of valve 7, that is, the piston, for example, is counteracted by a damper 8, which is moved within a magneto-rheological damper fluid 9, whose viscosity depends on the magnetic field of a coil 4. Due to ferrous particles in the magneto-rheological damper fluid 9, the damping of the valve movement increases as the magnetic field increases and thus slows down the burn-off.

The mechanical and pyrotechnical components of gas generator 2 are shown in FIG. 1 by way of an outline diagram only, as this is only one example for a possible application of the circuit arrangement; supplementary reference is made to the corresponding state of the art mentioned above.

Moreover the circuit arrangement is also suitable for other gas generators whose ignition process can be influenced by a magnetic field, e.g. for gas generators using propellant gases that can be directly influenced by the magnetic field.

The circuit arrangement 1 for driving the gas generator 2 features a supply voltage source U and a parallel self-sufficient capacitor 15, which will supply the gas generator 2 during a self-sufficiency period in the event of a failure of the supply voltage source U. In addition, the coil 4 for generating the electromagnetic field in the gas generator 2 is a functional component of the circuit. Using a measurement element 5, here embodied as a shunt resistor, the current i flowing through the coil 4 is detected and compared via a control circuit 12 with a nominal value or a lower and upper threshold, and depending on the result of this comparison a circuit element 11, arranged in series to the coil 4, is controlled by pulse width modulation; and in order to achieve fast switching times such a circuit element usually is a microelectronic type. The setup of the control circuit 12 and the generation of the drive signal for the microelectronic circuit element 11 can be copied directly from usual switching controllers. The nominal value of the current i or the corresponding lower and upper comparison threshold values are specified via a control signal 14 in accordance with the required trigger behavior, with the control circuit 12 computing the corresponding threshold values while taking into account the specific characteristics of the magneto-rheological damper fluid 9 and the required trigger speed; from these threshold values, the Pulse Width Modulation signal for driving switch 11 is generated by comparison with the actual current.

Between circuit element 11 and the coil 4, a free-wheeling diode 10 is connected in parallel to the coil 4, with an opposite polarity to that of supply voltage source U, which free-wheeling diode 10 provides for the maintenance of the current flow from the energy stored in the coil 4 as long as the microelectronic switch 11 is open. This causes a significant reduction in the energy loss on circuit element 11; in this way, the gas generator 2 can also be driven by a relatively small self-sufficient capacitor 15 of just a few microfarad for a specified period of self-sufficiency in the event of a supply voltage failure.

Also, in the particularly preferred embodiment shown here, a resistor 16 is arranged in series to the free-wheeling diode 10, which resistor, however, features a switchable bridging 13 outlined here in the form of a switch. This switchable bridging 13 is closed in normal operation so that in the free-wheeling phase—i.e. with the circuit element 11 opened—the coil current i flows via this bridging 13 and the diode 10. This low-ohmic free-wheeling circuit features a particularly low rate of dissipation, which is very advantageous for normal operation but specifically also in the event of self-sufficiency when receiving a voltage supply from the self-sufficiency capacitor 15. But this also causes a relatively low discharge of the coil 4. This, too, is advantageous for controlling the constancy of current i, as it allows a low impulse rate to be selected for driving switch 11. But consequently only the opening of switch 11 will reduce the magnetic field of the coil 4 relatively slowly. If a fuel burn-off is initially strongly retarded by a strong magnetic field and thus by a high damping effect of the magneto-rheological damper fluid 9, the magnetic field can only be slowly reduced for the later acceleration of the burn-off. For a faster reduction of the magnetic field in the coil 4, in particular for accelerating the ignition process of the vehicle occupant protection device, bridging 13 is opened and the coil 4 is discharged via resistor 16, which accelerates the discharge according to $\tau=L/R$. In this way, a different value for the coil current i can be set quickly or reduced down to zero. Here, the bridging 13 is driven by the control circuit 12 in relation to the signal 14.

Alternatively, even in switch operation between a blocked and saturated condition, a single transistor may form the outlined circuit element 13, and, in discharge operation—driven into the partial pass range—act as a resistor element 16.

It is furthermore conceivable that resistor element 16 is to be embodied as a controllable element, e.g. in the form of a transistor according to the above proposal, which is initially switched into a conductive condition and subsequently, over a period of time, driven into the blocked condition by way of the partial pass range. In this way, the voltage induced therein during the discharge of the coil 4 can be controlled and, if suitably input, even regulated.

Figure 2:
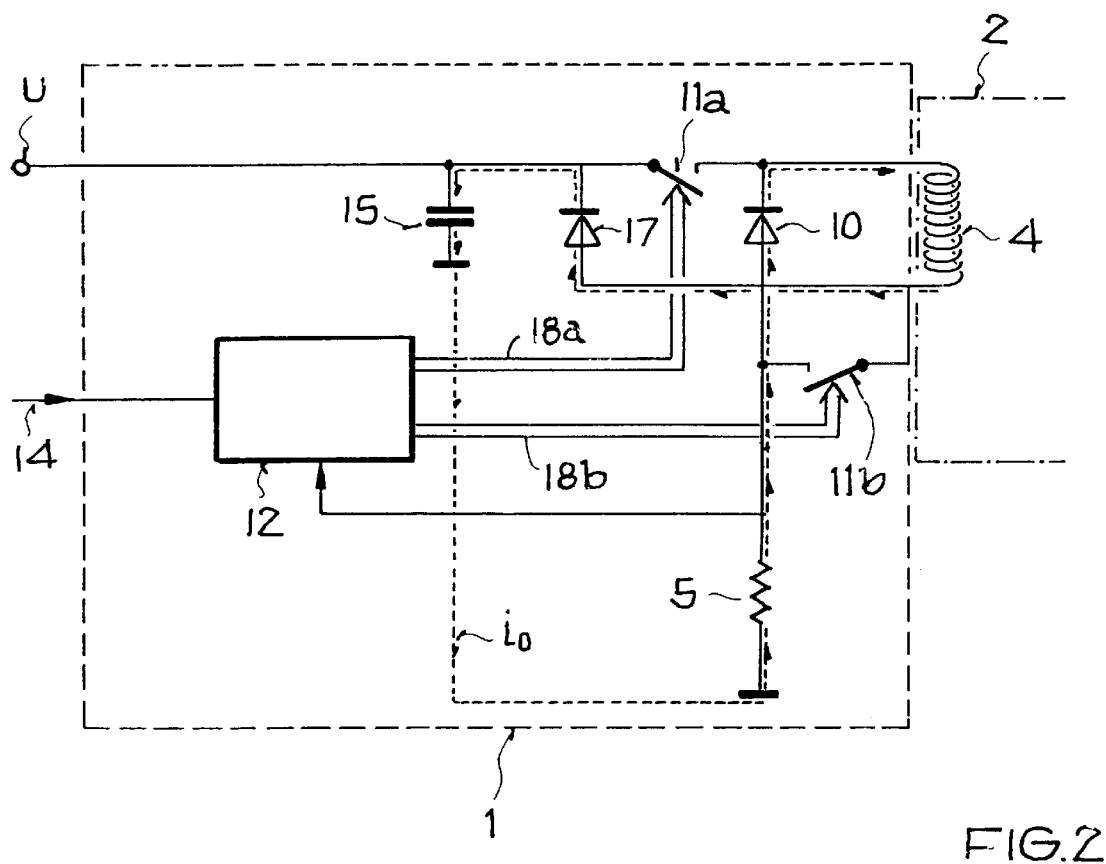

Moreover, FIG. 2 also shows an alternative embodiment of the circuit arrangement where circuit elements 11a and 11b are provided on both sides of the coil 4 and driven by control 12 via signals 18a/18b, and where—in addition to the free-wheeling diode 10 (between the high side of the coil 4 and ground)—a further diode 17 is provided, which is also polarized opposite to the polarization of the supply voltage U but located in between the low side of the coil 4 and the self-sufficiency capacitor 15.

In this circuit arrangement, with open circuit elements 11a and 11b, and via the diode 17, the fast discharge of the coil 4 is effected via the discharge current path i0, outlined here by a dotted line, to the self-sufficiency capacitor 15, via ground through the measurement resistor 5 and the diode 10. This return feed of the energy stored in the coil 4 into the self-sufficiency capacitor 15 again increases the efficiency of the circuit arrangement and thus reduces its energy consumption; in particular, this is of special significance in the event of a supply voltage failure. Furthermore, it is especially in the critical switchover moment that the self-sufficiency capacitor 15 acts in a particularly low ohmic and damping fashion, so that in relation to a fixed resistor, as shown in FIG. 1, a minor voltage is induced on the coil 4.

The circuit is protected against single faults by the circuit elements 11a and 11b located on both sides of the coil 4. There are two alternatives for driving the circuit. On the one hand, in normal operation, the circuit element 11b can remain permanently closed, with only the circuit element 11a being controlled by means of pulse width modulation. In the circuit arrangement according to FIG. 2, during the free-wheeling phase and with the circuit element 11a in an open condition, there will then result the free-wheeling current path—low ohmic via the free-wheeling diode 10 and the closed circuit element 11b.

It would also be conceivable to connect the free-wheeling diode 10 direct to ground, so that the free-wheeling current path would then initially flow from the coil 4 via the diode 10 to ground, and then via measurement resistor 5 and circuit element 11b.

However, it would appear to be particularly preferable to connect the circuit elements 11a and 11b in synchronism so that even in normal operation freewheeling is effected via the self-sufficiency capacitor 15. This significantly increases the discharge speed of the coil 4 and thus the response speed of the circuit arrangement, without noticeably reducing the efficiency in relation to the variant with a closed second circuit element 11b.

What is claimed is:

1. Circuit arrangement (1) for driving an occupant protection system (3) gas generator (2) whose ignition process can be influenced by a magnetic field, comprising:
   a) a coil (4) for generating an electromagnetic field,
   b) a supply voltage source (U) and a parallel self-sufficient capacitor (15), which will supply the gas generator (2) for a period of self-sufficiency in the event of a failure of the supply voltage source (U),
   c) a control circuit (12), which controls a circuit element (11) connected in series to the coil (4) by pulse width modulation,
   d) and a free-wheeling diode (10), which is connected in between circuit element (11) and coil (4), in parallel to the coil (4) and with a polarity opposite to the polarity of the supply voltage source (U).

2. Circuit arrangement according to claim 1 wherein a load resistor (16) is arranged in series to a free-wheeling current path, and with the load resistor (16) having a switchable bridging (13).

3. Circuit arrangement according to claim 2 wherein, for building up as well as for controlling the constancy of the magnetic field in the coil (4), the load resistor (16) is bridged, and wherein for a faster reduction of the magnetic field in the coil (4), in particular for accelerating the ignition process of the vehicle occupant protection device, the bridging is opened, and wherein the coil is discharged via the load resistor (16).

4. Circuit arrangement according to claim 1 wherein
   a) a first circuit element (11a) is connected between supply voltage source (U) and the coil (4), and a second circuit element (11b) is connected between the coil (4) and the ground,
   b) the free-wheeling diode (10) is connected in between the first circuit element (11a) and the coil (4), in parallel to the coil (4) and with a polarity opposite to the polarity of the supply voltage source (U), and
   c) a further diode (17), with a polarity opposite to the polarity of the supply voltage source (U), is also provided and connects the coil (4) orientated towards the second circuit element (11b) with the parellel self-sufficient capacitor (15), and
   d) the control circuit (12) drives by pulse width modulation at least the first circuit element (11a) in order to charge the coil (4).

5. Circuit arrangement according to claim 4 wherein the discharge of the coil (4) is effected by a return feed of the energy stored therein into the parallel self-sufficient capacitor (15); to this end both circuit elements (11a, 11b) are opened.

6. Circuit arrangement according to claim 1, wherein:
   a) a measurement element (5) is provided for the detection of a current (i) flowing through the coil (4);
   b) the control circuit (12) will compare the current (i) through the coil (4) with a nominal value, and drive the circuit element(s) (11, 11a, 11b) by pulse width modulation in relation to the result of the aforesaid comparison, and thus regulates the current (i) to assume the nominal value.

* * * * *